(12) United States Patent
Zhu

(10) Patent No.: US 11,847,255 B2
(45) Date of Patent: Dec. 19, 2023

(54) ANTI-TAMPER PROTECTION CIRCUIT

(71) Applicant: Shenzhen Time Waying Technology Co., Ltd., Guangdong (CN)

(72) Inventor: Qiang Zhu, Guangdong (CN)

(73) Assignee: Shenzhen Time Waying Technology Co., Ltd., Shenzhen (CN)

(*) Notice: Subject to any disclaimer, the term of this patent is extended or adjusted under 35 U.S.C. 154(b) by 0 days.

(21) Appl. No.: 18/049,644

(22) Filed: Oct. 26, 2022

(65) Prior Publication Data
US 2023/0074225 A1 Mar. 9, 2023

Related U.S. Application Data

(63) Continuation of application No. PCT/CN2021/083931, filed on Mar. 30, 2021.

(30) Foreign Application Priority Data

Apr. 30, 2020 (CN) .......................... 202020714503.6
Apr. 30, 2020 (CN) .......................... 202020718115.5

(51) Int. Cl.
*G06F 21/86* (2013.01)
*G09G 3/32* (2016.01)

(52) U.S. Cl.
CPC ............... *G06F 21/86* (2013.01); *G09G 3/32* (2013.01); *G09G 2330/027* (2013.01); *G09G 2330/04* (2013.01)

(58) Field of Classification Search
CPC ...................................................... G06F 21/86
See application file for complete search history.

(56) References Cited

FOREIGN PATENT DOCUMENTS

| CN | 201230199 Y | 4/2009 |
| CN | 101593016 A | 12/2009 |
| CN | 110720115 A | 1/2020 |

OTHER PUBLICATIONS

International Search Report of PCT Patent Application No. PCT/CN2021/083931 dated Jun. 28, 2021.

*Primary Examiner* — Gustavo Polo

(57) ABSTRACT

Provided is an anti-tamper protection circuit including a switch trigger port, a tamper signal transmission port, a power supply unit, and a signal output port. The switch trigger port is connected to a switch, the signal output port is connected to a digital movie server, and the tamper signal transmission port is configured to transmit a tamper signal transmitted to the signal output port through the tamper signal transmission port. In the present disclosure, when an LED display screen is powered off, a battery inside the digital cinema server would continue to power the digital cinema server to maintain proper functioning of the digital cinema server, the power supply unit also powers the anti-tamper protection circuit to guarantee anti-tamper operation of the anti-tamper protection circuit, thereby enabling continuous protection of information security and maintenance of digital copyright, and such that the requirements of information handling standards are satisfied.

10 Claims, 4 Drawing Sheets

ANTI-TAMPER PROTECTION CIRCUIT

CROSS REFERENCE OF RELATED APPLICATIONS

The present disclosure is a Continuation Application of PCT Application No. PCT/CN2021/083931, filed on Mar. 30, 2021, which claims the priority of Chinese Utility Model Application No. 202020718115.5, filed on Apr. 30, 2020, and the priority of Chinese Utility Model Application No. 202020714503.6, filed on Apr. 30, 2020, the entire contents of which are hereby incorporated by reference.

TECHNICAL FIELD

The present disclosure relates to the field of display technology, and in particular to an anti-tamper protection circuit.

BACKGROUND

To protect the data from tampering, the LED display currently only has a basic door detection system to monitor a door closure state. However, in the event of a power outage, this system cannot continue to monitor the door state, effectively protect digital copyright, or comply with information processing standards.

As a result, the LED display needs a special anti-tamper protection circuit that can continue to protect information security, maintain digital copyright, and comply with information processing standard requirements even when the LED display is powered off.

SUMMARY

The technical problem to be solved by the present disclosure is to provide an anti-tamper protection circuit, which solves the problem in the prior art of not being able to continuously protect the information security in the LED display under power failure.

In order to solve the above technical problems, the present disclosure uses the following technical solutions.

An embodiments of the present disclosure provides an anti-tamper protection circuit including: a switch trigger port, a tamper signal transmission port, a power supply unit, a first MOS transistor, a second MOS transistor, a third MOS transistor and a signal output port, wherein a first input of the first MOS transistor is electrically connected in parallel with the switch trigger port to a first output of the power supply unit, a second input of the first MOS transistor is electrically connected in parallel with a first input of the second MOS transistor to a second output of the power supply unit, a second input of the second MOS transistor is electrically connected in parallel with a first input of the third MOS transistor to a third output of the power supply unit, a second input of the third MOS transistor is electrically connected in parallel with one end of the signal output port to a fourth output of the power supply unit, an output of the first MOS transistor, an output of the second MOS transistor, an output of the third MOS transistor and the other end of the signal output port are electrically connected in parallel to a ground terminal, the tamper signal transmission port is electrically connected to the first input of the first MOS transistor, the input of the second MOS transistor or the input of the third MOS transistor.

In some embodiments, a first resistor is provided respectively between the first input and the output of the first MOS transistor, between the first input and the output of the second MOS transistor, and between the first input and the output of the third MOS transistor, and the output of the first MOS transistor, the output of the second MOS transistor, and the output of the third MOS transistor are grounded.

In some embodiments, the tamper signal transmission port includes: a first signal transmission port and a second signal transmission port; and the first signal transmission port is electrically connected to the first input of the first MOS transistor and to the first input of the second MOS transistor, respectively, and the second signal transmission port is electrically connected to the first input of the third MOS transistor; or the first signal transmission port is electrically connected to the first input of the first MOS transistor or to the first input of the second MOS transistor, and the second signal transmission port is electrically connected to the first input of the third MOS transistor.

In some embodiments, the power supply unit includes: a diode and a charge/discharge capacitor, an input end of the diode is inputted with a voltage, an output end of the diode is electrically connected to one end of the charge/discharge capacitor and outputs a power supply voltage, respectively, and the other end of the charge/discharge capacitor is grounded.

In some embodiments, the first MOS transistor, the second MOS transistor and the third MOS transistor are N-channel MOS transistors.

An embodiment of the present disclosure also provide another anti-tamper protection circuit including: a switch trigger port, a tamper signal transmission port, a power supply unit, a first MOS transistor, a second MOS transistor and a signal output port, wherein the tamper signal transmission port includes a first signal transmission port and a second signal transmission port, a first input of the first MOS transistor, a first signal transmission port, and the switch trigger port are electrically connected in parallel to a first output of the power supply unit, a second input of the first MOS transistor, a first input of the second MOS transistor, and the second signal transmission port are electrically connected in parallel to a second output of the power supply unit, a second input of the second MOS transistor, and one end of the signal output port are electrically connected in parallel to a third output of the power supply unit, an output of the first MOS transistor, an output of the second MOS transistor and the other end of the signal output port are electrically connected in parallel to a ground terminal.

In some embodiments, a first resistor is respectively provided between the first input and the output of the first MOS transistor and between the first input end and the output of the second MOS transistor, and the output of the first MOS transistor and the output of the second MOS transistor are grounded.

In some embodiments, the first MOS transistor, the second MOS transistor are N-channel MOS transistors.

In some embodiments, the first output of the power supply unit, the second output of the power supply unit, and the third output of the power supply unit are provided with a second resistor.

In some embodiments, the power supply unit includes: a diode and a charge/discharge capacitor, an input of the diode is inputted with a voltage, an output of the diode is electrically connected to one end of the charge/discharge capacitor and outputs a power supply voltage, respectively, and the other end of the charge/discharge capacitor is grounded.

From the above description, compared with the prior art, the beneficial effect of the present disclosure is that:

The power supply unit is provided in the anti-tamper protection circuit, and when the LED display is powered off, the battery inside the digital movie server will continue to supply power to the digital movie server to maintain the normal operation of the digital movie server, and the power supply unit will also supply power to the anti-tamper protection circuit to ensure the anti-tamper work of the anti-tamper protection circuit, thereby enabling continuous protection of information security and maintenance of digital copyright, and such that the requirements of information handling standards are satisfied.

BRIEF DESCRIPTION OF THE DRAWINGS

In order to more effectively demonstrate the technical solutions in the embodiments or prior art of the present disclosure, the accompanying drawings that must be utilized in the description of the embodiments or prior art are briefly described below. It will be apparent that the accompanying drawings in the following description are only some, but not all, embodiments of the present disclosure. For those of ordinary skill in the art, other drawings may be obtained from the provided accompanying drawings without creative labor.

DETAILED DESCRIPTION OF THE EMBODIMENTS

In order to make the object, technical solutions and advantages of the present disclosure to be understood more clearly, the invention is described in further detail below in conjunction with the accompanying drawings and embodiments, the same or similar reference numbers throughout indicate the same or similar components or components having the same or similar functions. It should be understood that the specific embodiments described herein are intended to explain the invention only and are not intended to limit the invention. In addition, the technical features involved in the various embodiments of the invention described below can be combined with each other as long as they do not constitute a conflict with each other.

Different from related technologies having the problem of unable to continuously protect information security when the LED display in the state of power failure, the embodiments of the invention provide several anti-tamper protection circuits. In these several anti-tamper protection circuits, a switch trigger port is provided to connect a switch, a signal output port is connected to a digital movie server, a tamper signal transmission port is used to transmit a tamper signal, and the tamper signal will be transmitted to the signal output port through the tamper signal transmission port. The circuit structure and principle of these anti-tamper protection circuits will be elaborated below, and all MOS transistors described below are N-channel MOS transistors, and first inputs of these MOS transistors are all gates, second inputs of these MOS transistors are all drains, and outputs of these MOS transistors are all sources.

Embodiment 1

Figure 1:
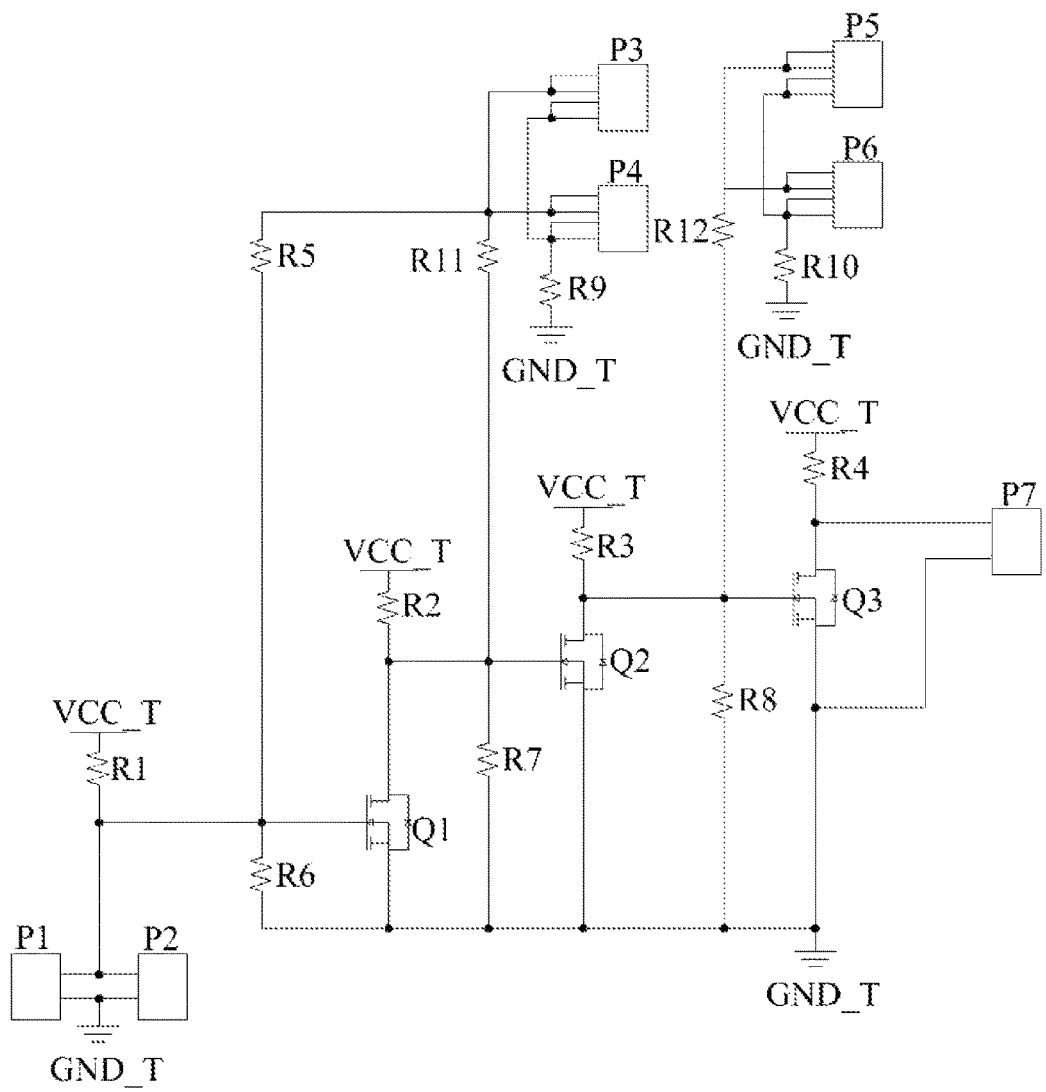
FIG. 1 shows a circuit diagram of a first type of anti-tamper protection circuit provided by an embodiment of the present disclosure.
Figure 2:
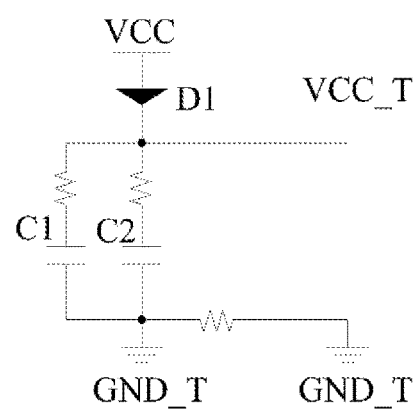
FIG. 2 shows a circuit diagram of a power supply unit provided by an embodiment of the present disclosure.

Referring to FIG. 1 as well as FIG. 2, FIG. 1 shows a circuit diagram of a first type of anti-tamper protection circuit provided by an embodiment of the present disclosure, and FIG. 2 shows a circuit diagram of a power supply unit provided by an embodiment of the present disclosure.

As shown in FIG. 1, an embodiment of the present disclosure provides an anti-tamper protection circuit including a switching trigger port (P1/P2), a tamper signal transmission port, a power supply unit, a first MOS transistor Q1, a second MOS transistor Q2, a third MOS transistor Q3, and a signal output port P7. A first input of the first MOS transistor Q1 is electrically connected in parallel with one end of the switching trigger port P1/P2 to a first output of the power supply unit VCC_T. The other end of the switching trigger port P1/P2 is grounded. A second input of the first MOS transistor Q1 is electrically connected in parallel with a first input of the second MOS transistor Q2 to a second output of the power supply unit VCC_T. A second input of the second MOS transistor Q2 is electrically connected in parallel with a first input of the third MOS transistor Q3 to a third output of the power supply unit VCC_T. A second input of the third MOS transistor Q3 is electrically connected in parallel with one end of the signal output port P7 to a fourth output of the power supply unit VCC_T. An output of the first MOS transistor Q1, an output of the second MOS transistor Q2, an output of the third MOS transistor Q3 and the other end of the signal output port P7 are electrically connected in parallel to a ground terminal GND_T. The tamper signal transmission port is electrically connected to the first input of the first MOS transistor Q1, the input of the second MOS transistor Q2, or the input of the third MOS transistor Q3. The first output VCC_T of the power supply unit, the second output VCC_T of the power supply unit, the third output VCC_T of the power supply unit, and the fourth output VCC_T of the power supply unit are connected to a resistor R1, a resistor R2, a resistor R3, and a resistor R4 respectively before being connected to the circuit.

In practical application, when the switch at the switch trigger port is closed, the first MOS transistor Q1 is cut off, the second MOS transistor Q2 is on, and the third MOS transistor Q3 is cut off. At this time, the signal output port P7 is in a high resistance state, that is, a normally closed port driving the digital movie server is open, and the digital movie server stops working. When the switch at the switch trigger port is open, the first MOS transistor Q1 is on, the second MOS transistor Q2 is cut off, the third MOS transistor Q3 is on, and the signal output port P7 is on, i.e. the normally closed port driving the digital movie server is closed, and the digital movie server works normally. Based on this, when the theater is temporarily powered off (i.e., the LED display is powered off), a battery inside the digital movie server will continue to supply power to the digital movie server to maintain the normal operation of the digital movie server, and the power supply unit will also supply power to the anti-tamper protection circuit to ensure the anti-tamper work of the anti-tamper protection circuit.

Specifically, as shown in FIG. 2, the power supply unit includes a diode D1 and charge/discharge capacitors C1 and C2. C1 and C2 are connected in parallel, an input end of the diode D1 is inputted with a voltage VCC, an output end of the diode D1 is electrically connected with one end of the charge/discharge capacitors C1/C2 and outputs a power supply voltage VCC_T, respectively, and the other ends of charge/discharge capacitors C1 and C2 are grounded. It should be understood that when the LED display is powered off, the charge/discharge capacitors C1 and C2 are in a discharging state; when the LED display is not powered off, the charge/discharge capacitors C1 and C2 are in a charging state.

Further, a resistor R6 is provided with between the first input and the output of the first MOS transistor Q1, a resistor R7 is provided with between the first input and the output of the second MOS transistor Q2, a resistor R8 is provided with between the first input and the output of the third MOS transistor Q3. The R6, R7 and R8 have a resistance of about 10MΩ, and the output of the first MOS transistor Q1, the output of the second MOS transistor Q2, and the output of the third MOS transistor Q3 are grounded.

Further, the tampered signal transmission ports include first signal transmission ports P3/P4 and second signal transmission ports P5/P6. Respectively, the first signal transmission port P3/P4 are electrically connected to the first input of the first MOS transistor Q1 through a resistor R5 and are electrically connected to the first input of the second MOS transistor Q2 through a resistor R11. The second signal transmission ports P5/P6 are electrically connected to the first input of the third MOS transistor Q3 through a resistor R12.

In the anti-tamper protection circuit provided in this embodiment, a power supply unit is provided, and when the LED display is powered off, the battery inside the digital movie server will continue to supply power to the digital movie server to maintain the normal operation of the digital movie server, and the power supply unit will also supply power to the anti-tamper protection circuit to ensure the anti-tamper work of the anti-tamper protection circuit, thereby enabling continuous protection of information security and maintenance of digital copyright, and such that the requirements of information handling standards are satisfied.

Embodiment 2

Figure 3:
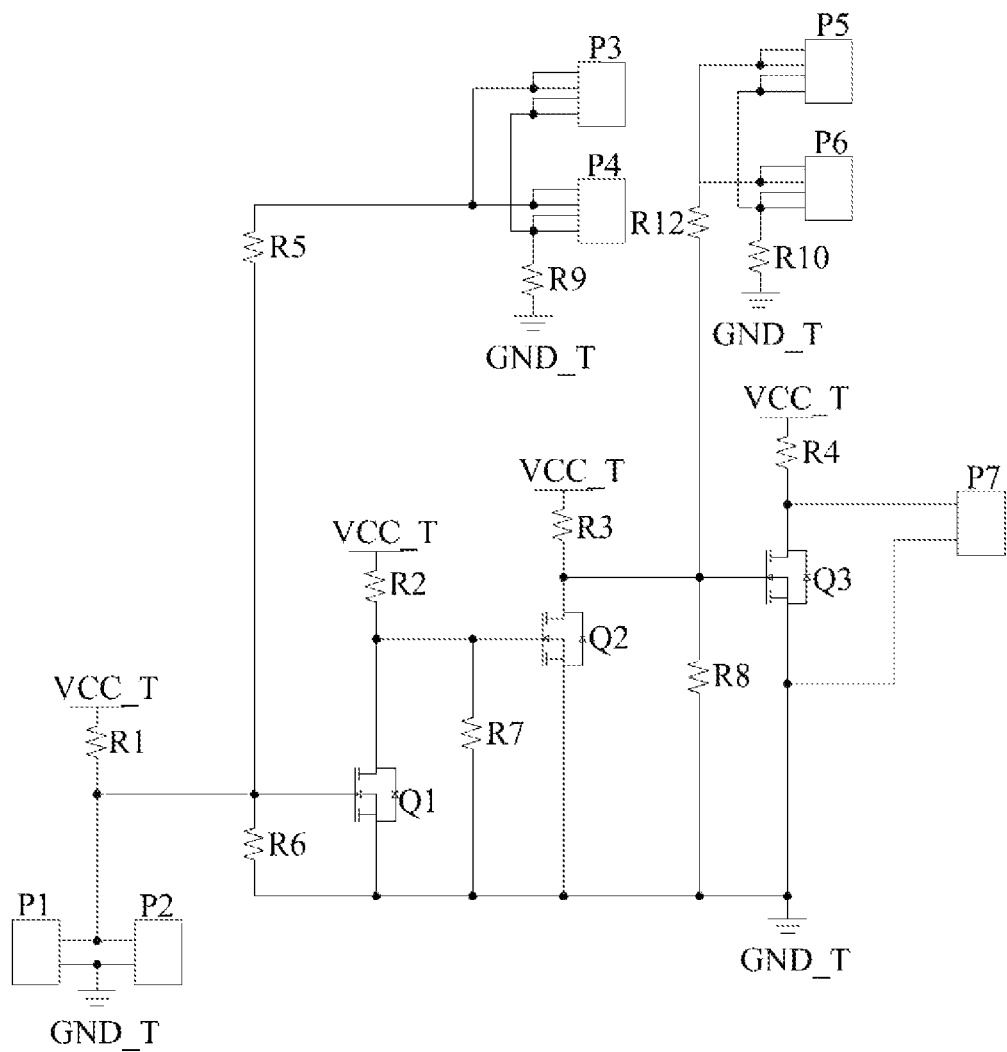
FIG. 3 shows a circuit diagram of a second type of anti-tamper protection circuit provided by an embodiment of the present disclosure.

Referring further to FIG. 3, FIG. 3 shows a circuit diagram of a second type of anti-tamper protection circuit provided by an embodiment of the present disclosure.

As shown in FIG. 3, unlike embodiment 1, the resistor R11 is omitted in this embodiment. In this case, the first signal transmission ports P3/P4 are electrically connected to only the first input of the first MOS transistor Q1, and the second signal transmission ports P5/P6 are electrically connected to the first input of the third MOS transistor Q3.

Embodiment 3

Figure 4:
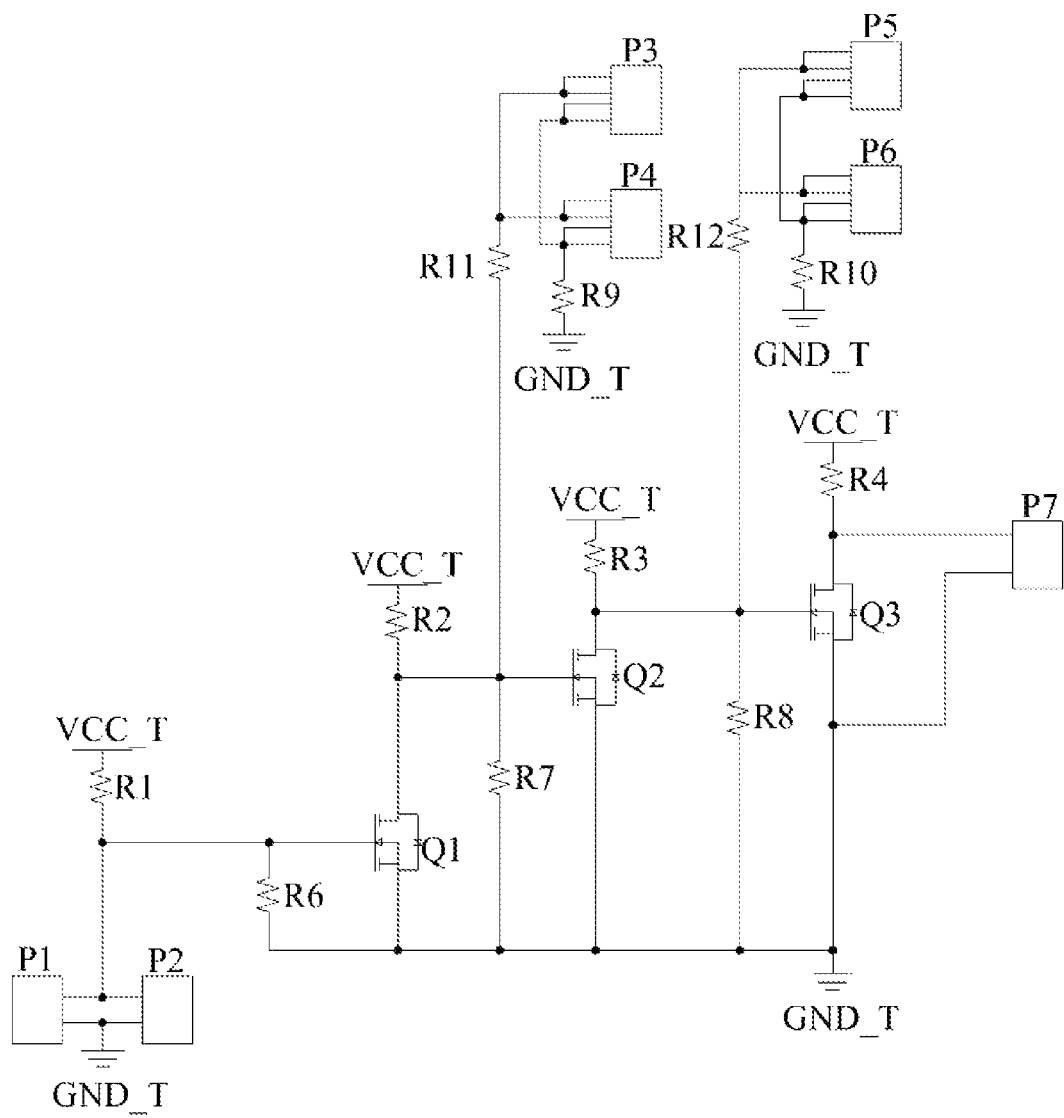
FIG. 4 is a circuit diagram of a third type of anti-tamper protection circuit provided by an embodiment of the present disclosure.

Referring further to FIG. 4, FIG. 4 shows a circuit diagram of a third type of anti-tamper protection circuit provided by an embodiment of the present disclosure.

As shown in FIG. 4, unlike embodiment 1, the resistor R5 is omitted in this embodiment. In this case, the first signal transmission ports P3/P4 are electrically connected to the first input of the second MOS transistor Q2 only, and the second signal transmission ports P5/P6 are electrically connected to the first input of the third MOS transistor Q3.

Embodiment 4

Figure 5:
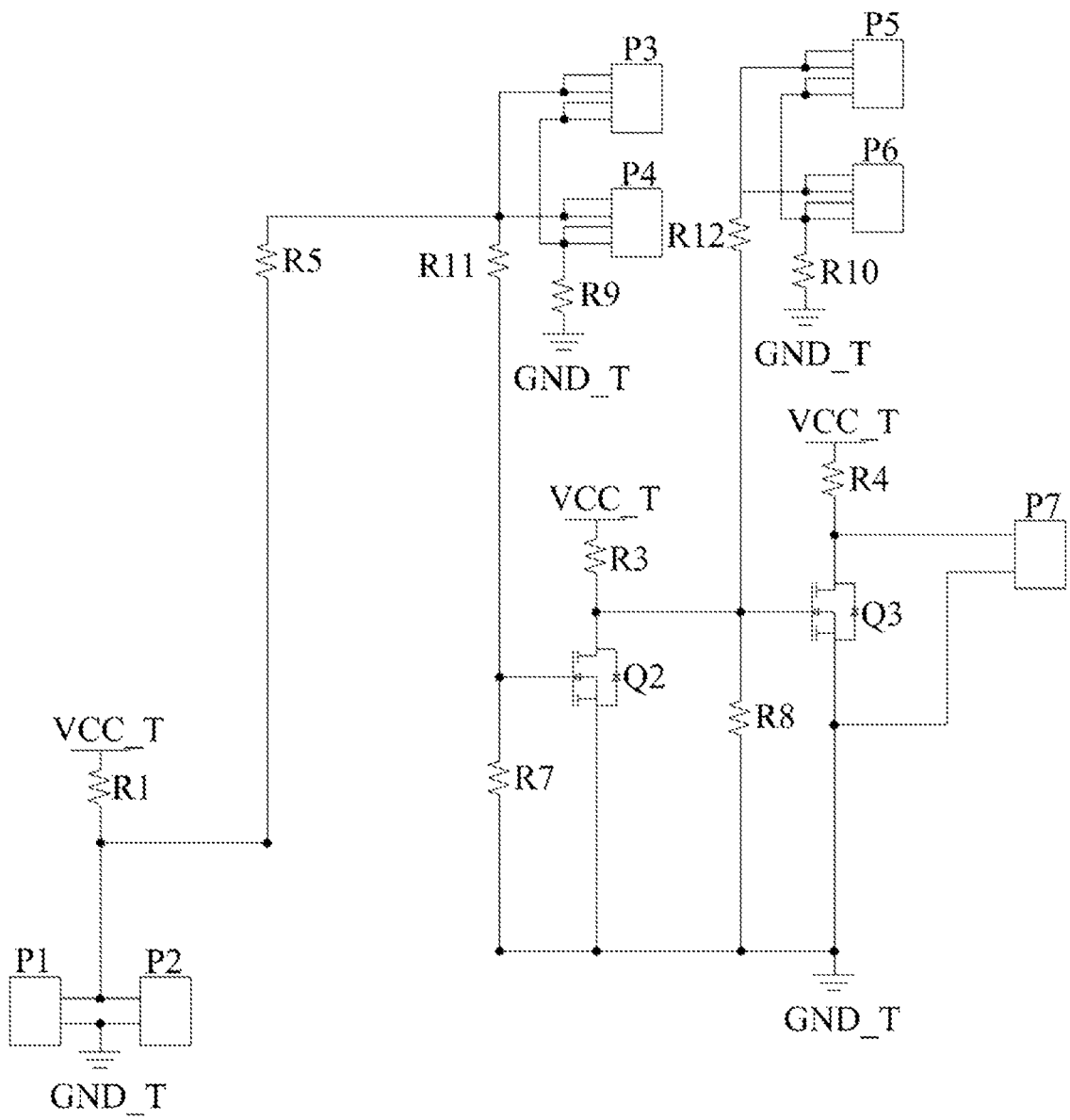
FIG. 5 is a circuit diagram of a fourth type of anti-tamper protection circuit provided by an embodiment of the present disclosure.

Referring further to FIG. 5, FIG. 5 shows a circuit diagram of a fourth type of anti-tamper protection circuit provided by an embodiment of the present disclosure.

As shown in FIG. 5, unlike embodiment 1, the first MOS transistor Q1 and the components associated with the first MOS transistor Q1 (e.g., resistors R2 and R6) are omitted in this Example. In this case, the first signal transmission ports P3/P4 are electrically connected between the switching trigger port (P1/P2) and the power supply unit through the resistor R5, as well as connected to the first input of the second MOS transistor Q2 through the resistor R11.

That is, the first input of the second MOS transistor Q2, the first signal transmission ports P3/P4 and one end of the switch trigger ports P1/P2 are electrically connected in parallel to the first output of the power supply unit VCC_T. The switch trigger ports P1/P2 are grounded. The second input of the second MOS transistor Q2, the second signal transmission ports P5/P6 and the first input of the third MOS transistor Q3 are electrically connected in parallel to the third output of the power supply unit VCC_T. The second input of the third MOS transistor Q3 and one end of the signal output port P7 are electrically connected in parallel to the fourth output of the power supply unit VCC_T. The output of the second MOS transistor Q2, the output of the third MOS transistor Q3 and the other end of the signal output port P7 are electrically connected in parallel to the ground terminal GND_T. And respectively, the first output VCC_T of the power supply unit is connected to a resistor R1, the third output VCC_T of the power supply unit is connected to a resistor R3, and the fourth output VCC_T of the power supply unit is connected to a resistor R4, before being connected to the circuit.

In practical application, when the switch at the switch trigger port is closed, the second MOS transistor Q2 is cut off and the third MOS transistor Q3 is on. At this time, the signal output port P7 is on, that is, the normally closed port driving the digital movie server is closed, and the digital movie server works normally. When the switch at the switch trigger port is open, the second MOS transistor Q2 is on and the third MOS transistor Q3 is cut off. At this time, the signal output port P7 is in a high resistance state, that is, the normally closed port driving the digital movie server is open, and the digital movie server stops working.

As can be seen from embodiments 1 to 4 described above, the anti-tamper protection circuit provided by any of embodiments 1 to 4 mainly includes two trigger points (P1/P2), four transmission points (P3/P4, P5/P6), one signal output point (P7) and charge/discharge capacitors. The trigger points P1 and P2 are connected to the switch, and when the LED box door is opened or closed, the trigger switch switches between open state and closed state, and sends signals to the P3/P4, and then the P3/P4 transmit signals to the P5/P6. And the P7, which is connected to the digital movie server, will trigger a state change of the normally closed (NC) port of the digital movie server after receiving the signals (the digital movie server will interrupt or resume the output of the movie signal source immediately after receiving the signals, to protect the digital copyright).

In fact, the anti-tamper protection circuit provided in any of embodiments 1 to 4 is arranged on a HUB board of each LED box, and the transmission points P3/P4 and P5/P6 are connected in series with the anti-tamper protection circuit on the HUB board in the adjacent vertical box and the horizontal LED box, respectively. When the whole LED display is working, if a back cover of individual LED box is opened, making a micro switch be triggered, then a signal will be sent to the adjacent LED box, and the sent signal can be transmitted through the horizontal interfaces and the vertical interfaces (i.e. transmission points P3/P4, P5/P6) between LED boxes, and finally transmitted to the digital movie server. The digital movie server will also interrupt the output of a movie signal source immediately after receiving the signal.

It should be noted that each embodiment in the content of the present disclosure is described in a progressive manner, with an emphasis on how it differs from the others. And the same and similar parts between each embodiment can be referred to each other.

It should also be noted that in the content of the present disclosure, relational terms such as first and second are used only to distinguish one entity or operation from another, and do not necessarily require or imply any such actual relationship or order between these entities or operations. Moreover, the terms "includes," "comprises," or any other variation thereof are intended to cover non-exclusive inclusion, such that a process, method, article, or apparatus that includes a set of elements includes not only those elements, but also other elements not expressly listed, or elements that are inherent to such a process, method, article, or apparatus. Without further limitation, the elements defined by the statement "including a . . . " do not preclude the existence of additional identical elements in the process, method, article, or apparatus that include the elements.

The foregoing description of the disclosed embodiments enables those skilled in the art to implement or use the contents of the invention. A variety of modifications to these embodiments will be apparent to those skilled in the art, and the general principles defined in the contents of the present disclosure can be implemented in other embodiments without departing from the spirit or scope of the contents of the present disclosure. Accordingly, the contents of the present disclosure will not be limited to those embodiments shown in the contents of the present disclosure, but will be subject to the widest scope consistent with the principles and novel features disclosed in the contents of the present disclosure.

What is claimed is:

1. An anti-tamper protection circuit comprising: a switch trigger port, a tamper signal transmission port, a power supply unit, a first MOS transistor, a second MOS transistor, a third MOS transistor and a signal output port, wherein a first input of the first MOS transistor is electrically connected in parallel with the switch trigger port to a first output of the power supply unit, a second input of the first MOS transistor is electrically connected in parallel with a first input of the second MOS transistor to a second output of the power supply unit, a second input of the second MOS transistor is electrically connected in parallel with a first input of the third MOS transistor to a third output of the power supply unit, a second input of the third MOS transistor is electrically connected in parallel with one end of the signal output port to a fourth output of the power supply unit, an output of the first MOS transistor, an output of the second MOS transistor, an output of the third MOS transistor and the other end of the signal output port are electrically connected in parallel to a ground terminal, the tamper signal transmission port is electrically connected to the first input of the first MOS transistor, the input of the second MOS transistor or the input of the third MOS transistor.

2. The anti-tamper protection circuit according to claim 1, wherein a first resistor is provided respectively between the first input and the output of the first MOS transistor, between the first input and the output of the second MOS transistor, and between the first input and the output of the third MOS transistor, and the output of the first MOS transistor, the output of the second MOS transistor, and the output of the third MOS transistor are grounded.

3. The anti-tamper protection circuit according to claim 1, wherein the tamper signal transmission port comprises: a first signal transmission port and a second signal transmission port; and
   the first signal transmission port is electrically connected to the first input of the first MOS transistor and to the first input of the second MOS transistor, respectively, and the second signal transmission port is electrically connected to the first input of the third MOS transistor; or
   the first signal transmission port is electrically connected to the first input of the first MOS transistor or to the first input of the second MOS transistor, and the second signal transmission port is electrically connected to the first input of the third MOS transistor.

4. The anti-tamper protection circuit according to claim 1, wherein the power supply unit comprises: a diode and a charge/discharge capacitor, an input end of the diode is inputted with a voltage, an output end of the diode is electrically connected to one end of the charge/discharge capacitor and outputs a power supply voltage, respectively, and the other end of the charge/discharge capacitor is grounded.

5. The anti-tamper protection circuit according to claim 1, wherein the first MOS transistor, the second MOS transistor and the third MOS transistor are N-channel MOS transistors.

6. An anti-tamper protection circuit comprising a switch trigger port, a tamper signal transmission port, a power supply unit, a first MOS transistor, a second MOS transistor and a signal output port, wherein the tamper signal transmission port comprises a first signal transmission port and a second signal transmission port, a first input of the first MOS transistor, a first signal transmission port, and the switch trigger port are electrically connected in parallel to a first output of the power supply unit, a second input of the first MOS transistor, a first input of the second MOS transistor, and the second signal transmission port are electrically connected in parallel to a second output of the power supply unit, a second input of the second MOS transistor, and one end of the signal output port are electrically connected in parallel to a third output of the power supply unit, an output of the first MOS transistor, an output of the second MOS transistor and the other end of the signal output port are electrically connected in parallel to a ground terminal.

7. The anti-tamper protection circuit according to claim 6, wherein a first resistor is respectively provided between the first input and the output of the first MOS transistor and between the first input end and the output of the second MOS transistor, and the output of the first MOS transistor and the output of the second MOS transistor are grounded.

8. The anti-tamper protection circuit according to claim 6, wherein the first MOS transistor, the second MOS transistor are N-channel MOS transistors.

9. The anti-tamper protection circuit according to claim 6, wherein the first output of the power supply unit, the second output of the power supply unit, and the third output of the power supply unit are provided with a second resistor.

10. The anti-tamper protection circuit according to claim 6, wherein the power supply unit comprises: a diode and a charge/discharge capacitor, an input of the diode is inputted with a voltage, an output of the diode is electrically connected to one end of the charge/discharge capacitor and outputs a power supply voltage, respectively, and the other end of the charge/discharge capacitor is grounded.

* * * * *